United States Patent
de Sa e Silva et al.

[15] 3,699,413
[45] Oct. 17, 1972

[54] POWER DRIVE CIRCUIT FOR INDUCTIVE LOADS

[72] Inventors: Claudio de Sa e Silva; Daniel R. Cheever, both of Bozeman, Mont.

[73] Assignee: Summit Engineering Corporation, Bozeman, Mont.

[22] Filed: Nov. 9, 1970

[21] Appl. No.: 88,026

[52] U.S. Cl. ............ 318/138, 318/696, 321/45, 307/109
[51] Int. Cl. ............................................ H02k 37/00
[58] Field of Search......318/696, 685, 254, 138, 939; 307/109; 320/1, 1 X; 321/45

[56] References Cited

UNITED STATES PATENTS

| | | |
|---|---|---|
| 3,120,634 | 2/1964 | Genuit ..................... 321/45 C |
| 3,532,959 | 10/1970 | Erickson ..................... 320/1 |
| 3,526,821 | 9/1970 | Thomas ..................... 320/1 |
| 3,248,633 | 4/1966 | Guarrera ..................... 320/1 |
| 3,366,799 | 1/1968 | Fitch ..................... 320/1 X |
| 3,497,792 | 2/1970 | Mlynar ..................... 320/1 X |
| 3,402,334 | 9/1968 | Newton ..................... 318/696 |
| 3,530,347 | 9/1970 | Newell ..................... 318/138 |
| 3,379,946 | 4/1968 | Croymans ..................... 318/138 |
| 3,486,096 | 12/1969 | Van Cleave ..................... 318/696 |
| 3,156,858 | 11/1964 | Reitherman ..................... 318/138 |
| 3,444,447 | 5/1969 | Newell ..................... 318/696 |

*Primary Examiner*—G. R. Simmons
*Attorney*—C. Michael Zimmerman

[57] ABSTRACT

A power drive circuit is described for rapidly energizing a load having a high inductance with a potential greater than that for which the load is rated, while yet protecting the load from the high current normally associated with such a high potential. The preferred circuit includes a pair of capacitors connected in series between the output terminals of the load and switching means to switch the load from across one of the capacitors to across the other to successively discharge each of the capacitors through the load while simultaneously charging the capacitor not being discharged. A diode is placed in shunt with each of the capacitors to clamp the voltage across the capacitor to a predetermined level reached by it as it discharges. In several of the described embodiments, a second source of potential is provided for maintaining current flow through the load after it has been initially energized by the capacitance discharge. The invention is further described in combination with a stepping motor with which it has found particular utility.

1 Claim, 4 Drawing Figures

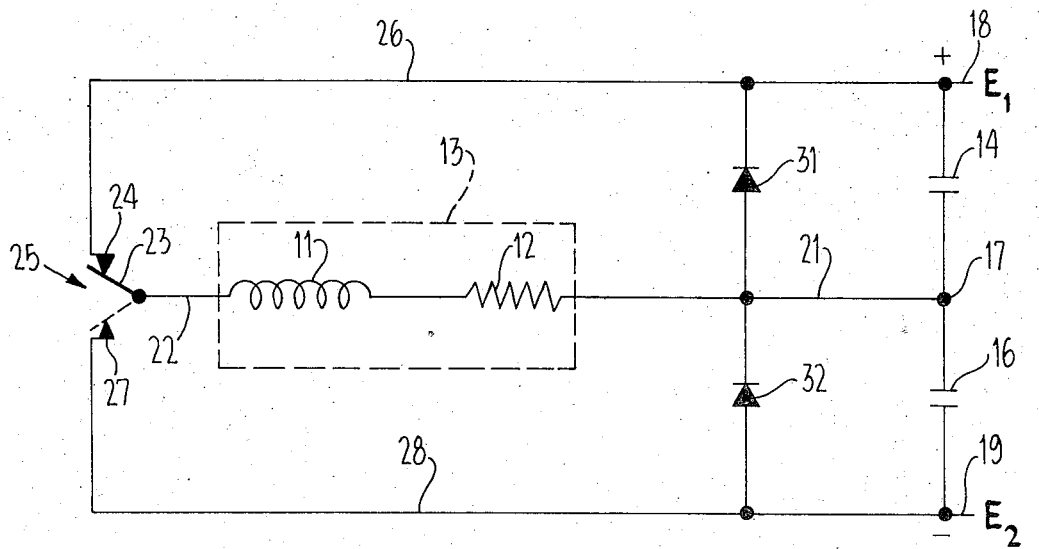
Fig_1
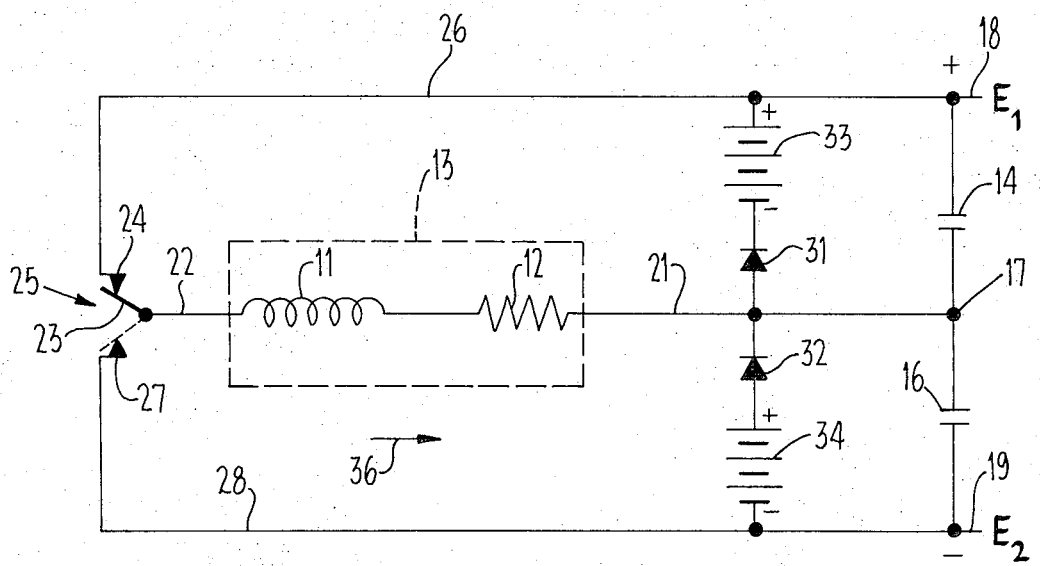
Fig_2
INVENTOR.
Claudio de Sa e Silva
BY Daniel R. Cheever
ATTORNEY

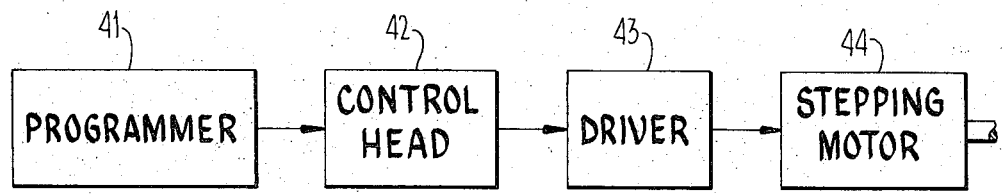
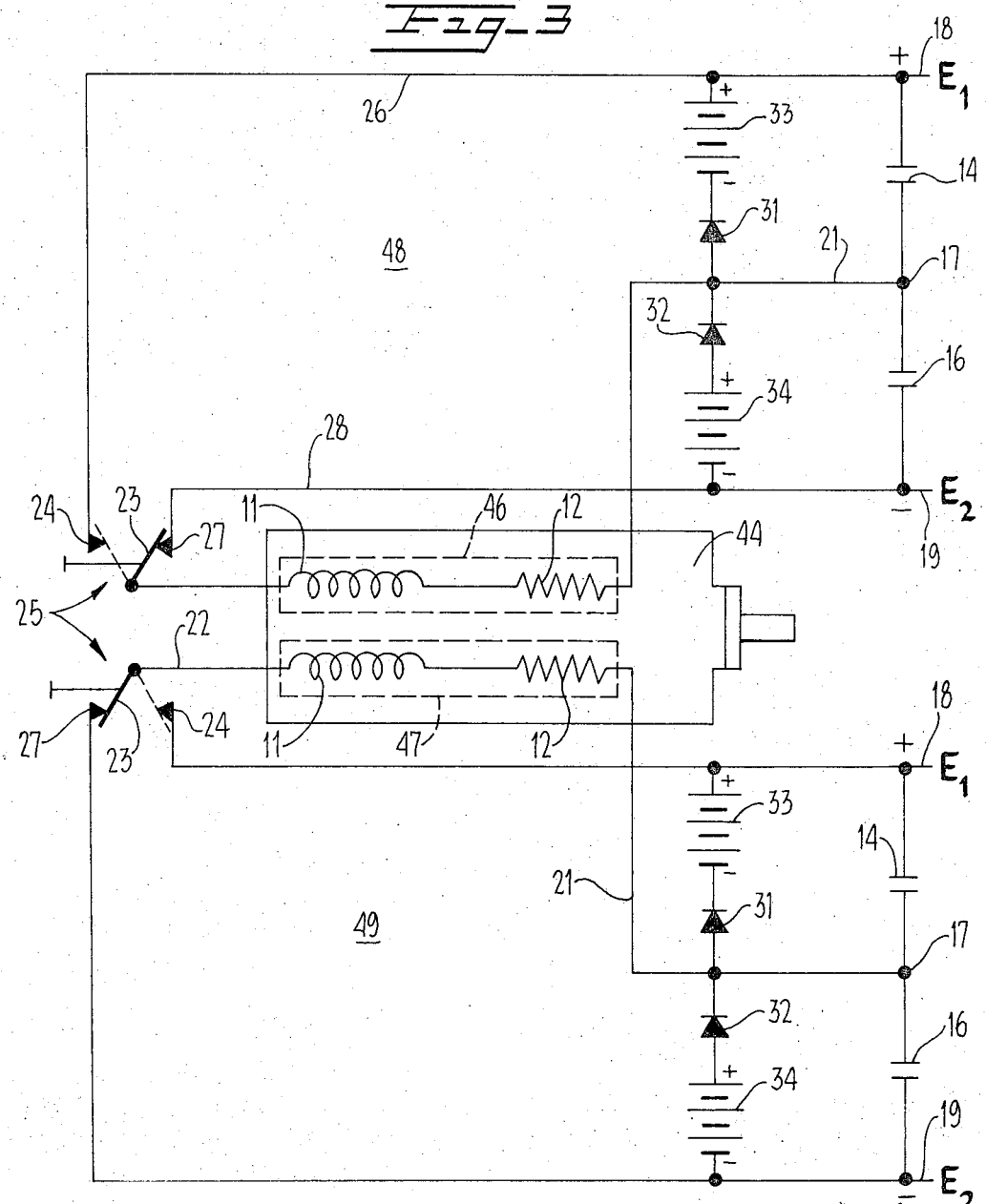

POWER DRIVE CIRCUIT FOR INDUCTIVE LOADS

BACKGROUND OF THE INVENTION

This invention relates to a power drive circuit for an inductive load and, more particularly, to such a drive circuit which, in a simple and yet highly efficient manner, provides fast current build-up through the load while protecting the load from excessive currents.

It is quite often desirable to be able to quickly energize a load having a high inductance. For example, one often wishes to quickly start electromagnetic devices, such as relays, stepping switches, stepping motors, magnetic clutches, etc. Devices of this nature are commonly used to convert electrical energy to mechanical motion, and it is sometimes quite important that the response time of the device, i.e., the time required for the mechanical motion to begin after the electromagnetic device has been energized, be as short as practical. For example, in many uses of stepping motors, such as with a programmed numerical indexer, the speed with which the motor can be stepped often determines whether or not it is practical for use in a particular operation. The problem is, however, that the high inductance of stepping motors and other electromagnetic devices often limits the speed with which such devices can be energized and made to perform their intended function. That is, if a voltage is applied to an inductance, the current, starting from zero, will increase as a function of time with a rate of change proportional to the ratio of the voltage to the inductance. It should be apparent that if a fast current build-up is desired with a consequent fast-starting time of the mechanical motion, the inductance should be made small and the voltage large. The value of the inductance though is proportional to the power conversion of the device and is therefore, as a rule, fixed for any particular situation. The voltage, however, can be increased to obtain a consequent increase in the speed of operation of the device, provided that certain precautions are taken to prevent the current from exceeding at any time the safe limit or rating of the inductive load.

While there have been several different methods employed in the past to provide a high voltage for starting without an attendant high current during steady-state operation, they leave much to be desired. One of the more familiar prior methods has been to place a current-limiting resistor in series with a high supply voltage providing the energizing source. Although such an arrangement has the effect of reducing the time-constant of the circuit and thereby increasing the speed of operation, it is quite inefficient, especially where high currents are involved. All of the load current in such an arrangement must pass through the added resistor where a large proportion of the power is wasted and undesirable heat is generated. This is a particularly disadvantageous feature in the case of stepping motors in which a plurality of armature windings or coils must be successively and rapidly energized. The total heat generated and power lost in such successive energizations can be quite high.

In order to escape from the inefficiency inherent in any drive using a current-limiting resistor, others in the field have used a "chopper" circuit in combination with a high voltage source to limit the final current from the source. While the use of such a circuit provides the desired greater efficiency, considerable additional circuitry that must be extremely reliable is required since with the use of a high voltage source, a chopper failure can be ruinous to the equipment. Other methods have been tried, all involving undesirable circuit complexities and such operations as high current, high rate switching that generate heat and noise.

SUMMARY OF THE INVENTION

The present invention relates to a highly efficient power drive circuit for inductive loads which is capable of providing fast current build-up in the load for fast operation but which protects the load from excessive currents in a quite simple and yet reliable manner. In its basic aspects, the invention comprises the connection in series with the load of a capacitance and a reference voltage point, and the provision of a source of direct current potential having a value greater than that for which the load is rated in a steady-state condition. Means are provided for switching the series-connected inductive load and capacitance from between one output terminal of the potential source and the reference voltage point to between the other output terminal of the potential source and the reference voltage point. This results in the potential of the source being applied to the load through the capacitance upon each switching operation so that even though the load is initially subjected to a high voltage greater than that for which it is rated, because of the presence of the capacitance, the load is not subjected to an attendant excessive current. That is, upon each switching operation the capacitance is discharged or charged through the load, and as the current flow through the load increases, the voltage applied to the load decreases. Thus the load is subjected to a high initial voltage providing the desired high rate of current build-up but is effectively protected from the excessive current flow normally associated with a voltage having a value greater than that for which the load is rated.

Most desirably, the circuit also includes means for controlling any resonance which might be caused between the inductive load and the capacitance upon the initial energization of the load with the high voltage. While such a means could take many forms, it is preferable that it be in the form of a simple diode which is connected in parallel across the capacitance and is conductive of current bypassing the capacitance when the voltage across such capacitance reaches a predetermined value during its discharge. A diode provides this function in an inexpensive and yet highly efficient and reliable manner.

In those uses of the drive circuit in which it is desired to maintain current flow through the load once it has been initially energized, a second source of potential can be provided for maintaining the current flow. Most simply, the second source of potential is in series with a diode across the capacitance. With such an arrangement, the diode can not only act to clamp the voltage and prevent resonance as discussed above, but also act as a switch for the second source of potential to provide current flow through the load after it has been initially energized by the first source of potential.

The invention has been found to be particularly useful for driving multi-phase stepping motors. Such motors include more than one armature coil which must be energized and thus, require more than one power drive circuit. For this reason, the simplicity and inexpensiveness of the present power drive circuit makes the same especially appropriate for such a multiple use. Moreover, the faster energization of each coil obtainable with the present invention is cumulative in such a motor. That is, an increase in the speed of energization of each coil results in the total stepping rate of the motor being greatly enhanced.

BRIEF DESCRIPTION OF THE DRAWINGS

With reference to the accompanying two sheets of drawings:

FIG. 1 is a simplified schematic diagram of a preferred embodiment of the invention;

FIG. 2 is a simplified schematic diagram similar to FIG. 1 illustrating a preferred embodiment of the invention which includes means for maintaining current flow through an inductive load after it is energized;

FIG. 3 is a block diagram illustrating the power drive circuit of the invention incorporated into a numerical indexer which includes a stepping motor; and FIG. 4 illustrates in simplified form a preferred embodiment of the invention in combination with such a stepping motor.

DETAILED DESCRIPTION OF THE PREFERRED EMBODIMENTS

With reference to FIG. 1, a generally simplified circuit diagram of a preferred embodiment of a power drive circuit for an inductive load is illustrated. The inductance and resistance of the load to be driven are respectively referred to by the reference numerals 11 and 12, and are enclosed within a dotted line rectangle 13 representative of the load. As indicated previously, load 13 can be any load it is desired to rapidly energize but which has a high inductance tending to limit the rate of current build-up therethrough and consequently limit the rate at which it can be energized.

In keeping with the invention, a capacitance is connected in series with load 13 and with a point which represents a reference voltage. More particularly, a capacitance in the form of two series-connected capacitors 14 and 16 are each respectively connected in series with the load 13 through a juncture point 17 which is representative of the reference voltage. As will appear hereinafter in the description of the operation of the circuit, in this preferred embodiment of the invention the reference voltage at point 17 is a "floating" voltage. That is, the voltage at point 17 varies depending upon the particular mode of the circuit.

A source of direct current potential having a value greater than that for which the load is rated in a steady-state condition is also provided. The leads 18 and 19 represent the output terminals of such a potential source. While the source most simply could be provided by a simple DC potential source such as a high voltage battery or the like, it is only necessary for the purposes of the invention that the terminals 18 and 19 represent different potential levels. Moreover, it is only necessary that the potential be a DC potential during the switching and discharging operation discussed below. Thus, the potential could be provided by a rectified AC potential or some other varying potential. However, in order to provide a faster current build-up in inductive load 13 than would normally occur, the potential difference between terminals or leads 18 and 19 should be greater than the potential under which the load 13 normally operates or for which it is rated.

Means are provided also for switching the inductive load from between one of the output terminals 18 or 19 and the reference voltage at point 17 to between the other output terminal 18 or 19 and such reference voltage point. More particularly, one end of the inductive load 13 is connected via a lead 21 to the point 17, and the other end thereof is connected by a lead 22 to the switch arm 23 of a double throw driving switch 25. The contact terminal 24 of the driving switch is connected through a lead 26 to potential output terminal 18, and the other contact terminal 27 of the switch is connected by a lead 28 to the source terminal 19. It will be appreciated that with this arrangement, upon movement of the switch arm 23 from between terminal 24 and terminal 27, the inductive load 13 and the reference voltage point 17 will be switched from in series with one of the capacitors 14 and 16 to in series with the other.

Means are also provided for controlling any resonance which might be caused between the inductive load 13 and the capacitor to which it is connected upon the throwing of the switch 23 from one of its positions to the other. Such resonance controlling means most desirably provides this function by clamping the voltage across each of the capacitors to a predetermined value reached by the capacitor as the same is discharged through the load. To this end, a pair of diodes 31 and 32 are respectively connected across, and in parallel with, each of the capacitors 14 and 16. Such diodes are selected to be conductive when the voltage across their respective capacitors reaches a predetermined value. The value of the voltage is chosen to either prevent or obtain a selected amount of resonance between the load and the capacitor with which it is connected.

To facilitate an understanding of the operation of the invention, let it first be assumed that the circuit is in a steady-state condition with switch arm 23 in contact with point terminal 24 as illustrated in solid lines. In such a mode, the potential at point 17 will be the same as that at terminal 18. In order to simplify the following discussion, this potential will be denoted $E_1$. Because of this similarity of the potential of point 17 and the source 18, the voltage drop across the capacitor 14 will be zero and no current will flow through the inductive load 13. There will be a voltage drop across the capacitance 16 however. That is, with the point 17 at potential $E_1$, the drop across the capacitor will be the difference between that potential and the potential at output terminal 19 or $E_1 - E_2$. This represents the full potential between the two output terminals of the potential source.

When it is desired to energize the load 13, the switch is activated to switch the load from its connection between terminal 18 and the reference voltage point 17 to between terminal 19 and such reference voltage point. That is, the switch arm 23 is moved to disconnect the lead 22 from the contact 24 and connect the same to the contact 27. Since the energy stored in the capacitors 14 and 16 cannot change instantly, the voltage that appears initially across the load upon this switching is the voltage originally across capacitor 16, i.e., $E_1 - E_2$, the potential difference between the output terminals 18 and 19. Since this potential difference is large, and at least greater than the normal voltage rating for the load in a steady-state condition, the time rate of change of current through the load will also be large as is desired. The result is that the load is rapidly energized to perform its intended function. For example, when the load is an armature winding or coil of a stepping motor, the coil will be rapidly energized to cause rotational stepping of the rotor of the motor.

Simultaneously with current build-up through the load 13, the voltage across the capacitor 16 will decrease. Thus, the load current rate of change will also decrease gradually, approaching zero as the voltage drop across the capacitor 16 approaches zero. That is, the voltage at point 17 will approach and become $E_2$, the potential at source terminal 19. Thus, even though an initial high voltage is applied to the inductive load to cause rapid energization of the same, because of the capacitor, the current is effectively prevented from reaching the high level which is normally associated with or attendant to such a high voltage. It will be appreciated that this protection of the load is obtained with a relatively simple and quite reliable circuit arrangement.

The diode 32 is selected to become conductive as the voltage across the capacitor 16 approaches zero. Thus, after the initial discharge of the capacitor, the diode conducts and carries the full load current on a path bypassing the capacitor. In doing so, such diode effectively clamps the voltage drop across the capacitor to a predetermined value - in this case zero. It therefore prevents the voltage at point 17 from becoming negative with respect to $E_2$ and thus prevents "ringing" or a resonant condition between the load and capacitor 16 from being formed. Once the current begins flowing through the diode 32 and through the load, the presence of the resistance 12 of the load will cause the current to decay exponentially to zero.

It will be appreciated that the circuit conditions are now the reverse of what they were at the start. That is, the voltage at point 17 is $E_2$ and no current flow is present in the circuit. However, the voltage across the capacitor 14 will now be the difference between the voltage at terminal 18 and point 17 or, in other words, $E_1 - E_2$. Thus, when it is desired to again energize the load 13, the switch need only be thrown from its position in contact with point terminal 27 to in contact with point terminal 24. This will cause the capacitor 16 to discharge through the load in the same manner as did the capacitor 14. The operation of the circuit upon such discharge is the same as described above except that the current flow through the load will be reversed.

From the above, it will be seen that the switching means switches the load from across one of the capacitors to across the other, and that because the capacitors are in series across the source of potential, as one of the capacitors is being discharged through the load the other one will be simultaneously charged for subsequent discharge through the load. Moreover, the reference voltage, i.e., the voltage point at 17, "floats." It varies from $E_1$ to $E_2$ and back again as the position of the switch is correspondingly changed. And while the capacitance of the arrangements is in the form of two capacitors in order to reduce the capacitance required of each, it will be appreciated that only one capacitor is necessary. For example, if the capacitor 14 was not included in the circuit and the capacitance of capacitor 16 was doubled, the circuit would be operational just as discussed above except that when the switch 23 was placed in contact with the point terminal 27, the capacitor 16 will control the build-up of current through the load by charging rather than discharging.

As has been mentioned previously, it is sometimes desirable to maintain current flow through the load after it has been once energized by the circuit of the invention. For example, it is desirable to maintain a steady-state current flow through armature windings of a stepping motor after they have been energized so that the rotor of the same is maintained in any particular rotational orientation to which it is stepped. The desired current flow can be provided by including as a part of the circuit a second source of potential for sustaining the current flow at the desired level after energization of the load. FIG. 2 illustrates a preferred embodiment of the invention in which such a second source of potential is provided for maintaining a steady-state current. The circuit of FIG. 2 is basically the same as that illustrated in FIG. 1 except for the inclusion of the second source of potential. For this reason, like parts of the circuits are referred to by like reference numerals.

The second source of potential is representative in the circuit of FIG. 2 by two separate batteries 33 and 34 connected in series with the diodes 31 and 32, respectively, across and in parallel with the capacitors 14 and 16. As is illustrated, the polarities of the batteries are oriented to correspond with the polarities of terminals 18 and 19, and the diodes 31 and 32 are oriented to conduct current forwardly through the batteries. The voltage of each of the batteries is selected to maintain the desired current flow through the load whenever either battery is in circuit with the load. Since the potential across leads 18 and 19 should be greater than the rated potential of the load, the battery voltage required to maintain the rated current should be small compared with the first source of potential. That is, it should be small compared to $E_1 - E_2$. Moreover, the diodes 31 and 32 should be selected to be conductive of the rated load current supplied by each of the respective batteries.

When the switch arm 23 is in contact with switch contact 24 as shown by the solid line in the drawing, the diode 31 is conducting current from the battery 33 through the load in the direction shown by the arrow 36. The voltage at point 17 is lower than the voltage $E_1$ by an amount equal to the voltage drop across the load. When the switch arm 23 is disconnected from point terminal 24 and is connected to point 27, the voltage initially applied across the load is this voltage minus the voltage drop across the load. As the voltage drop across the load is small compared to the voltage drop across the capacitor 16, the load current quickly reverses itself due to the applied high reverse voltage. Thus the inductive load 13 is rapidly energized in the reverse direction. However, as was described in connection with the circuit of FIG. 1, as the current builds up in the load, its rate of change gradually decreases. Such decrease continues until the voltage across the capacitor becomes equal to the voltage of battery 34. Then the diode 32 is conductive of the current from the battery through the load and thus maintains the current to the load at the desired steady-state condition until the switch 23 is thrown again to reverse the operation with the rapid energization.

The power drive circuit of the invention has been found to be particularly useful in driving the various armature coils of stepping motors incorporated into numerical indexers. As is known, in many uses of the numerical indexer, it is necessary for the stepping motor to make a great many steps in a short a time as is practical. For this reason, use of the power drive circuit as opposed to prior art drive circuits for such a motor can be especially beneficial in view of its efficiency and reliability. FIG. 3 schematically illustrates in block diagram form such a numerical indexer into which the power drive circuit of the invention has been incorporated. The indexer includes a programmer 41, such as a punched tape, a computer output or the like, for providing instructions as to the various operations to be performed by the motor. The readout of such instructions are fed into a control head represented at 42 which controls the switches of the driver 43 for the motor 44. FIG. 4 illustrates a simplified schematic diagram of the driver 43 and its relationship with the stepping motor 44. The particular motor illustrated is a two phase stepping motor having two separate armature windings or coils providing separate inductive loads schematically indicated at 46 and 47. The driver 43 includes separate power drive circuits 48 and 49, respectively, for each of the armature coils. The circuits 48 and 49 are each identical to the circuit illustrated in FIG. 2 and like parts are referred to by like numerals. In operation, the armature coils 46 and 47 are successively energized by their respective driver circuits 48 and 49. That is, the switch 23 of circuit 48 is first activated from in contact with, for example, terminal 27 to in contact with terminal 24 to cause a first step of the motor, and then the switch arm 23 of circuit 49 is moved from in contact with, for example, its terminal 27 to in contact with its terminal 24 to cause a second stepping of the motor. The switch 23 of circuit 48 is then again moved from one of its positions to the other to again energize its coil to cause a third stepping of the motor, and so on. Thus, by successively actuating each of the armature coils 46 and 47 the stepping motor is made to step in accordance with instructions received from the programmer. The direction of the stepping can be reversed in accordance with conventional practice by reversing the phase or order of the switching of the two coils.

The invention has been described with respect to preferred embodiments thereof, and it will be appreciated by those skilled in the art that many changes and variations can be made within the scope of the same. Moreover, the description has been made in connection with a simplified diagram to facilitate an understanding. For example, although the switches shown are illustrated as typical mechanical switches, it will be appreciated that normally the switching operation is performed by transistors or other suitable electronic devices. It is intended that the scope of the invention be limited only by the claims.

We claim:
1. A power drive circuit for a multi-phase stepping motor having a plurality of separate armature coils comprising a capacitance connected in series with each armature coil of said motor and a reference voltage; a source of direct current potential formed independently of said armature coils and having a pair of output terminals, the potential difference between each of said terminals and said reference voltage point having, at a specific time, a value greater than that for which each armature coil is rated is a steady-state condition; means for successively applying said potential difference through said capacitance to said load by successively switching each of said armature coils from between one of said terminals and said reference voltage to between the other of said terminals and said reference voltage at the specified time at which said potential difference between said reference voltage and said other terminal is at said greater potential to thereby subject each of said armature coils successively to a potential initially greater than that for which each coil is rated and cause successive, rapid energization of the coils for a consequent rapid stepping rate of said motor without attendant excessive currents being caused to flow through any of said coils; a second source of potential associated with said armature coils for maintaining current flow through each of said coils after the first source of potential has initially energized the coil through its capacitance whereby the rotor of said motor is maintained at a preselected rotational orientation between steppings of said motor; the capacitance connected in series with each of said armature coils being in the form of a pair of series-connected capacitors connected to cross the output terminal of said source of potential, and said switching means switching each of said armature coils from in series with and across one of said capacitors to in series with and across the other thereof whereby said reference voltage point is a floating potential between said capacitors; and a diode connected in parallel with each of said capacitances, and said second source of potential is connected in series with each of said diodes across the capacitances, each diode being conductive of current from said second source through the coil associated with the capacitor with which said diode is in parallel upon the voltage across said capacitor reaching a predetermined value as the capacitor discharges through its associated coil whereby said diode acts both as a switch for said second source of potential and as means for clamping the voltage across said capacitance at a predetermined value.

* * * * *